Jan. 15, 1924.  1,480,693
G. J. RACKHAM ET AL
ENDLESS TRACK VEHICLE
Filed March 17, 1923   3 Sheets-Sheet 1
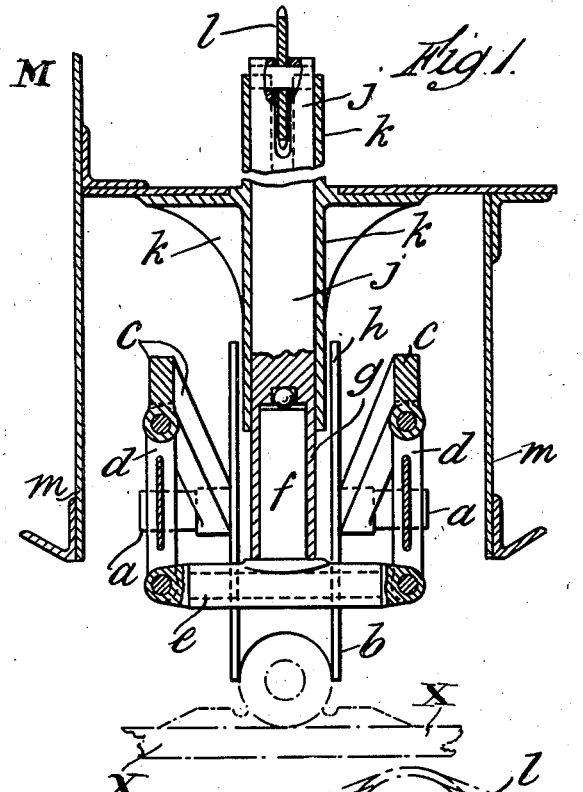
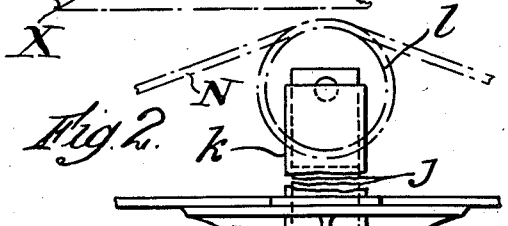
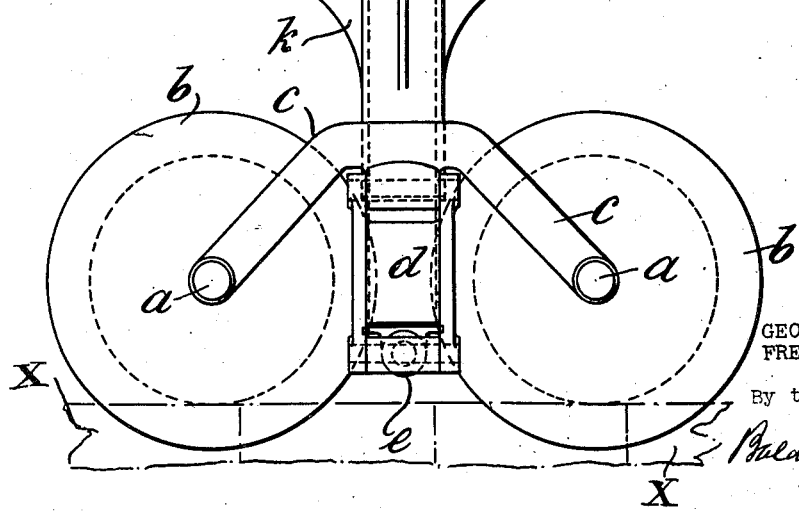
INVENTORS:
GEORGE JOHN RACKHAM
FREDERICK B. LAMB,
By their Attorneys,

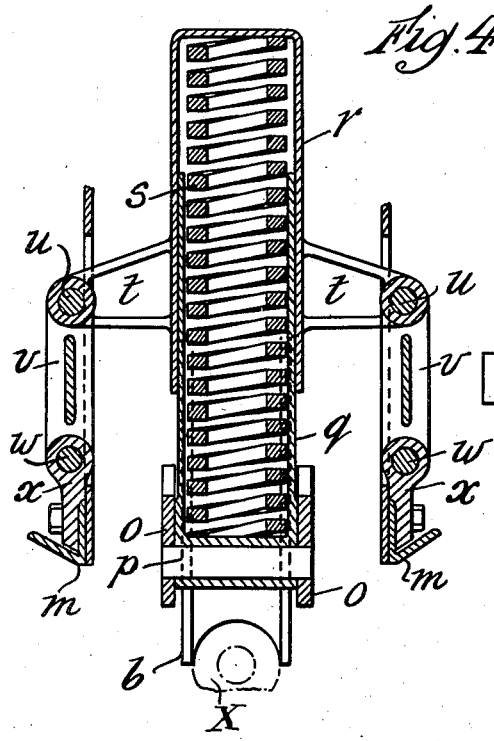
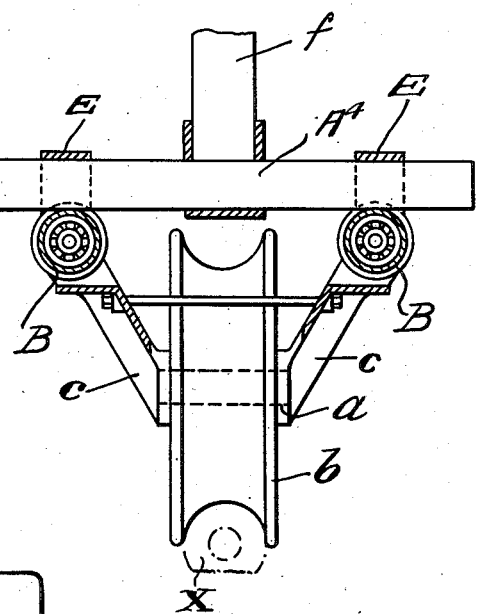
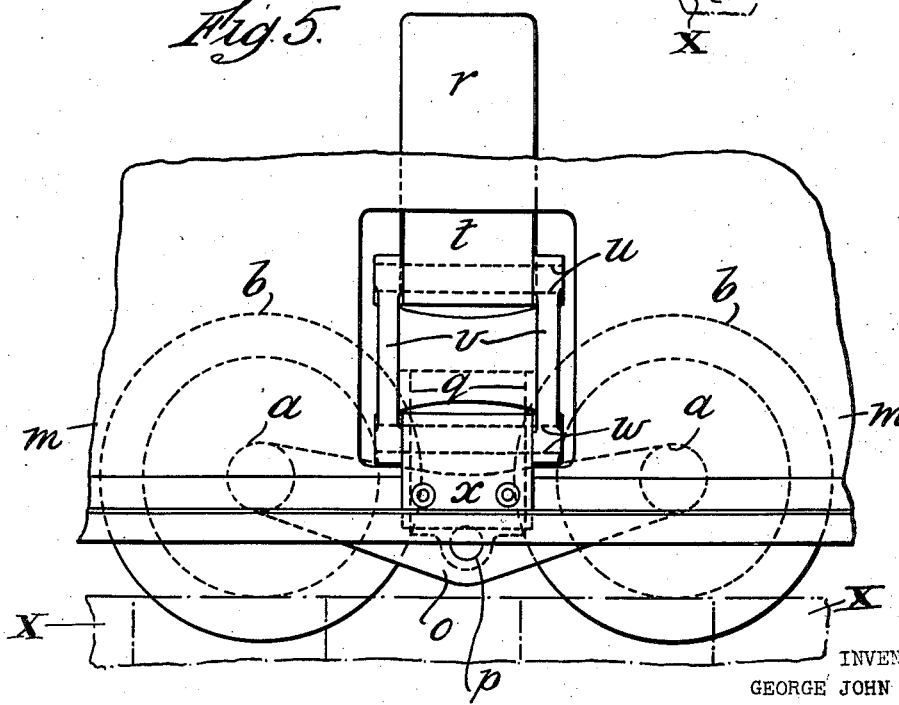

Jan. 15, 1924. 1,480,693
G. J. RACKHAM ET AL
ENDLESS TRACK VEHICLE
Filed March 17, 1923 3 Sheets-Sheet 3
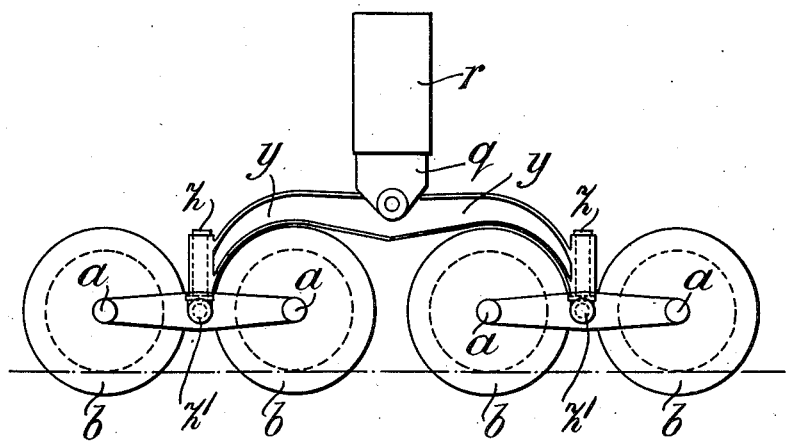
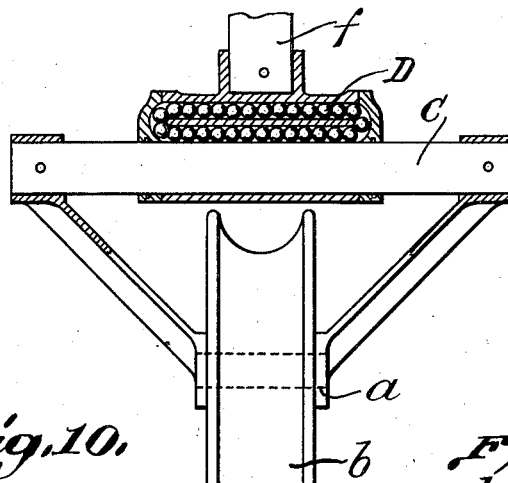
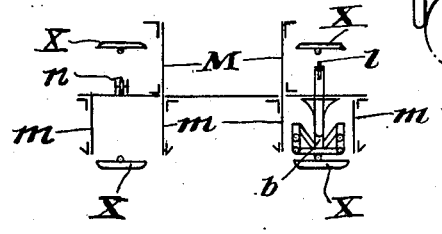
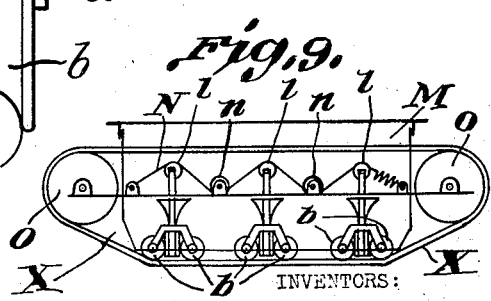
INVENTORS:
GEORGE JOHN RACKHAM,
FREDERICK B. LAMB,
By their Attorneys, Patented Jan. 15, 1924.

1,480,693

UNITED STATES PATENT OFFICE.

GEORGE JOHN RACKHAM AND FREDERICK BRIDDON LAMB, OF LONDON, ENGLAND, ASSIGNORS TO ROADLESS TRACTION, LIMITED, OF LONDON, ENGLAND.

ENDLESS-TRACK VEHICLE.

Application filed March 17, 1923. Serial No. 625,751.

*To all whom it may concern:*

Be it known that we, GEORGE JOHN RACKHAM and FREDERICK BRIDDON LAMB, both subjects of the King of Great Britain, and residing at Charlton House, Old Charlton, London, England, have invented new and useful Improvements in Endless-Track Vehicles, of which the following is a specification.

This invention relates to endless track vehicles and is applicable to vehicles in which coil or leaf spring suspension or cable suspension is used.

The principal object of the invention is to provide means whereby the vehicles are more easily steered.

The vehicles are provided with laterally flexible tracks and may be steered in any ordinary way, for instance, by driving one track faster than the other or by turning the front part of the vehicle carrying the tracks which in the case of laterally flexible tracks causes them to be laid in a curve.

The vehicles are of the type in which bogies having two or more wheels run upon endless flexible tracks.

According to this invention the bogies are so mounted that they are free to move in a lateral direction. The bogies also preferably move in an up and down direction so that they accommodate themselves to the curve of the track; the bogies are also preferably allowed a slight angular movement.

Preferably the bogies are so mounted that when they have been caused to move laterally their tendency is to return to their central position.

The accompanying drawings show methods of connecting the bogies to the vehicle made in accordance with this invention. Figure 1 is a vertical section and Figure 2 a side elevation of a bogie which is allowed to move in a lateral direction and vertically up and down the frame of the bogie being supported by pivoted links which move parallel with each other. Figure 3 is a vertical section showing a modification of this arrangement in which the bogie frame has also a slight angular movement. Figure 4 is a vertical section and Figure 5 is a side elevation of a modification of the arrangement shown in Figures 1 and 2. in which coil springs are employed. Figures 6 and 7 are vertical sections of modifications, and Figure 8 is an elevation of a further modification.

Figures 9 and 10 are on a reduced scale and are largely diagrammatic.

Figure 9 is a side elevation showing how our improvements are applied to an endless track vehicle of well known construction.

Figure 10 shows a cross section of the parts shown in Figure 9.

In the drawings an endless track or tractor belt is indicated at X. This may be of the kind shown in the pending application of George John Rackham No. 613,004, filed Jan. 16, 1923, or in the patents of George John Rackham, No. 1,434,630 of Nov. 7, 1922 and No. 1,440,243 of Dec. 26, 1922.

In Figures 1 and 2, the shafts $a$ of the bogie wheels $b$ are mounted in a frame $c$ pivoted at its centre to two links $d$, each pivoted to a bar $e$ fixed to a post or plunger $f$ contained in a cylinder $g$, a ball $h$ being inserted between the end of the plunger and the cylinder. The cylinder $g$ is carried by another post or plunger $j$ which is free to move in guides $k$ upon the vehicle and which carries at its upper end a pulley $l$ upon which a suspension rope runs. Lateral movement of the bogie may be limited by skirting plates $m$ on the vehicle. It will be understood that the pulleys $l$ support a suspension rope, chain or cable in the manner indicated in Figures 9 and 10. In these figures of the drawings, the vehicle body is indicated at M. The bogies are indicated at $b$, the suspension rope, chain or cable at N, the track at X, the track pulleys at O and the pulleys on the frame which extend over the cable at $n$. The pulleys on the bogie posts are indicated at $l$.

It will be understood that there are bogies on both sides of the vehicle and that rope suspension is preferably employed on each side. The bogies and tracks are located within the track chambers or housings $m$ on opposite sides of the vehicle. Figure 3 shows a similar arrangement but in this case the pivots of the links $d$ to the frame $c$ and the bar $e$ are not vertical above one another and the former pivots are connected together by a link $n$.

In the arrangement shown in Figures 1 and 2, lateral movement of the bogie frame is permitted but in the arrangement shown in Figure 3, an angular movement of the frame is also permitted as indicated in dotted lines in the figure.

In Figures 4 and 5 the shafts $a$ of the bogie wheels $b$ are mounted on arms $o$ connected by a common pivot $p$ to the end of a cylinder $q$ which fits into another cylinder $r$, a spring $s$ being inserted between the two cylinders. Brackets $t$ are fixed to the cylinder $r$ each bracket being carried by a pivot pin $u$ connected by two links $v$ to another pivot pin $w$ mounted in a bearing $x$ on the vehicle.

In Figure 6 a cross bar $A^4$ is fixed to the end of the plunger $f$ as shown in Figure 1, while rollers B are carried by the bogie frame. The plunger $f$ is normally located directly above the bogie wheel $b$ and the plunger is fixed to the cross-bar $A^4$. The bogie frame $c$ is connected to the cross-bar $A^4$ by means of metal loops E provided with rollers B. The frame with the bogie wheel may thus move laterally on the cross-bar when the track X is flexed or bent laterally.

In Figure 7 a cross bar C fixed to the bogie is free to move laterally on a ball race D at the end of a plunger $f$ such as is described in Figure 1. Or the ball race may be fixed to the end of the cylinder shown in Figures 4 and 5. The plunger $f$ is normally located directly above the bogie wheel. The construction is such that the bogie frame and the bogie wheel may move laterally when the track is laterally flexed.

Figure 8 shows an arrangement which is a modification of that shown in Figure 4. In this case arms $y$ are pivoted to the end of the cylinder $q$ and bogies are mounted on each end of each of the arms $y$ so that they are free to turn on vertical pins $z$ and horizontal pins $z'$. The cylinder $r$ is as shown in Figure 4 connected by shackles to the frame of the machine.

The bogies shown constitute body-supporting devices for the vehicle, and while the constructions shown are preferred they may be varied within the scope of our invention.

The details of the devices involving the use of chains, ropes or cables for suspending the vehicle body are more fully described and shown in the application of George John Rackham No. 613,004 filed Jan. 16, 1923 and they are also shown in United States patent of Philip Henry Johnson No. 1,329,769 of Feb. 3, 1920.

What we claim is:—

1. An endless track vehicle comprising a laterally flexible tractor belt, a vehicle body and means for supporting the vehicle body comprising a wheel engaging the lower run of the belt, a frame in which the wheel is mounted, and connections between said frame and the vehicle body which permit the frame to swing bodily sidewise or laterally with the belt.

2. An endless track vehicle comprising laterally flexible tractor belts, a vehicle body and means for supporting the vehicle body comprising wheels engaging the lower runs of the tractor belts, frames in which the wheels are mounted, and connections between said frames and the vehicle body which permit the frames to swing bodily sidewise or laterally with the tractor belts.

3. An endless track vehicle comprising laterally flexible tractor belts, a vehicle body and means for supporting the vehicle body comprising wheels engaging the lower runs of the belts, frames in which the wheels are mounted and vertically movable connections between said frames and the vehicle body which also permit the frames to swing bodily sidewise or laterally with the tractor belts.

4. An endless track vehicle comprising tractor belts, a vehicle body, and means for supporting the vehicle body comprising wheels engaging the lower runs of the belts, frames in which the wheels are mounted, cables on which the vehicle body rests, and vertically movable connections between the frames and the track-engaging wheels and said cables which also permit the frames to swing bodily sidewise or laterally with the tractor belts.

5. An endless track vehicle comprising a vehicle body, a tractor belt and body-supporting devices housed within parts of the vehicle body which engage the belt and are mounted to move vertically and to also swing bodily laterally within the housings.

6. An endless track vehicle comprising a vehicle body, a tractor belt and body-supporting devices comprising a vertically movable post, a support on which the post rests, a frame suspending the post support and which rocks laterally with respect to the post support, and wheels carried by said frame adapted to engage the belt with which it is associated.

7. An endless track vehicle comprising a vehicle body, tractor belts on opposite sides of the vehicle, pulleys for the belts, and body-supporting devices each comprising a vertically movable post, a post support on which the post rests, a frame supporting the post support which rocks laterally, and wheels carried by said frame adapted to engage the track.

8. An endless track vehicle comprising laterally flexible tractor belts, a vehicle body, wheels engaging the lower runs of the tractor belts, frames in which the wheels are mounted, and connections between said frames and the vehicle body which permit the frames to move bodily sidewise or laterally with the tractor belts and to have an angular or tilting movement while swinging laterally.

9. An endless track vehicle, comprising a chassis, tractor belts on opposite sides of the vehicle, and body-supporting devices each comprising a vertically movable post, a post support on which the post rests, a frame from which the post support is suspended and which is adapted to rock laterally about axes located in the post support, and wheels carried by said frame adapted to engage the tractor belt and which support said frame on said belt.

10. An endless track vehicle comprising endless tracks, bogies connected with the vehicle, wheels on the bogies running on the tracks, connections between the wheels and the bogies adapted to allow the bogies to move in a lateral direction and also to have an angular movement out of the vertical.

11. In combination with a laterally flexible track, a bogie supporting or wheel-carrying frame which is mounted to swing laterally with the tractor belt when the latter is bent or flexed laterally for steering and other purposes.

12. In an endless track vehicle wherein the tractor belt is laterally flexible, a bogie frame provided with a wheel engaging the belt and which frame is mounted to swing sidewise with the belt when the latter is flexed.

In testimony that we claim the foregoing as our invention we have signed our names this 10 day of March 1923.

GEORGE JOHN RACKHAM.
FREDERICK BRIDDON LAMB.